United States Patent [19]

Zardi et al.

[11] Patent Number: 5,152,977
[45] Date of Patent: Oct. 6, 1992

[54] PROCESS FOR EXOTHERMIC HETEROGENEOUS SYNTHESIS WITH EXTERNAL RECOVERY OF HEAT

[75] Inventors: Umberto Zardi, Via Lucino 57, CH-6932 Berganzona; Giorgio Pagani, Lugano, both of Switzerland

[73] Assignees: Ammonia Casale S.A.; Umberto Zardi, both of Switzerland

[21] Appl. No.: 754,346

[22] Filed: Sep. 5, 1991

Related U.S. Application Data

[63] Continuation of Ser. No. 369,826, Jun. 22, 1989, abandoned, which is a continuation-in-part of Ser. No. 25,600, Mar. 13, 1987, Pat. No. 4,849,206.

[30] Foreign Application Priority Data

Jun. 27, 1988 [CH] Switzerland .................. 02457/88

[51] Int. Cl.$^5$ .................................................. G01C 1/04
[52] U.S. Cl. ................................... 423/659; 422/148; 422/192; 423/360; 423/361; 518/712; 518/728
[58] Field of Search ............... 423/359, 360, 361, 659; 518/712, 728

[56] References Cited

U.S. PATENT DOCUMENTS 4,849,206 7/1989 Zardi .................................. 423/361
4,867,959 9/1989 Grotz ................................. 423/361

FOREIGN PATENT DOCUMENTS 202454 11/1986 European Pat. Off. .
237888 9/1987 European Pat. Off. .

Primary Examiner—Wayne Langel
Attorney, Agent, or Firm—Ostrolenk, Faber, Gerb & Soffen

[57] ABSTRACT

In a process for exothermic and heterogeneous synthesis, for example of ammonia, in which the synthesis gas is reacted in several catalytic beds with axial-radial or only radial flow, the reaction gas is collected at the outlet from the last catalytic bed but one and is transferred to a system for heat recovery external to the reactor, and is re-introduced into the last catalytic bed.

1 Claim, 2 Drawing Sheets

PROCESS FOR EXOTHERMIC HETEROGENEOUS SYNTHESIS WITH EXTERNAL RECOVERY OF HEAT

The present application is a continuation of U.S. patent application Ser. No. 369,826, filed on Jun. 22, 1989, now abandoned, which is a continuation-in-part of U.S. patent application Ser. No. 025,600, filed Mar. 13, 1987, now U.S. Pat. No. 4,849,206.

BACKGROUND OF THE INVENTION

This invention concerns a process for exothermic heterogeneous synthesis in which the synthesis gas runs through a series of catalytic beds stacked but separate from one another contained within the same reaction space, where the gas leaving one bed runs through the next catalytic bed.

The invention also concerns reactors for this process, consisting of a pressure-resistant outer shell, of baskets for catalytic beds all inside the same shell, of a possible cartridge and of a heat regenerator.

In the production of ammonia the amount of heat which develops from the synthesis reaction of $N_2 + 3H_2$ is remarkable, such heat being generally recovered for the final purpose of producing steam used in the production cycle in order to reduce energy consumption.

The latest technologies aim at the maximum recovery of this synthesis heat at the highest degree of heat possible; synthesis units and their principal piece of equipment, the reactor, are therefore suitably designed for this purpose. In newly built plants, the reactors have several catalytic beds with intermediate cooling of the gas by means of indirect exchange through heat exchangers; in addition, part of the reaction heat is removed with an external cooling agent such as for example the feed water to the boiler or by generating steam, before the last reaction stage, in order to be able to generate at the maximum temperature possible (heat recovery at the highest degree of heat) without limiting the maximum reaction yield achievable.

Maximum temperature together with maximum yield are in effect two opposing requirements, as is widely demonstrated by the diagrams which show in abscissa the concentration of ammonia and in ordinate the temperature of the gas.

The most important designers of synthesis reactors have generally favored reactors with several catalytic beds in at least two distinct apparatus units in series, in order to satisfy the above-mentioned need for the optimal exchange of reaction heat (at the highest degree of heat possible) without limiting the maximum yield achievable (Fertilizer Focus, October, 1987).

In the case of two separate items or units of equipment, the first of these contains generally two catalytic beds with intermediate indirect cooling by means of an internal exchanger, while the second item or unit of equipment generally contains a single catalytic bed.

Between the two items of equipment heat exchange is achieved by introducing a boiler to produce stem. This is the case for the Topsoe Series 250 (Series 200 1 Series 50) reactor and for the Uhde reactor, both with radial flow of the gas in the catalytic beds (Fertilizer Focus, October, 1987, pages 36 and 39).

There are also reactors designed in three separate parts, each containing a catalytic bed with axial gas flow according to the design by C. F. Braun (Nitrogen Conference, Amsterdam 1986). In this case a boiler for the production of steam is introduced between the second and the third reaction unit (Nitrogen Conference, Amsterdam 1986, Mr. K. C. Wilson, Mr. B. J. Grotz, and Mr. J. Richez of CdF Chimie).

According to a recent patent by C. F. Braun (UK Patent Application 2132501A), the gas/gas exchanger between catalytic beds, which is normally conveniently situated inside the reactors with at least two beds within a single unit, is situated outside the reaction unit directly connected at the bottom of the shell containing a single catalytic bed.

To minimize the problem of tubes at a high temperature, the tube connecting the above-mentioned horizontal exchanger with the shell containing the catalytic bed is cooled by the fresh gas fed to the reactor.

After having pre-heated the fresh feed gas, the gas leaving the catalytic bed leaves the exchanger and feeds the unit containing the second catalytic bed (C. F. Braun reactor with several reaction units, as shown in FIG. 5 of the Wilson, Gritz, Richez report in the above-mentioned reference and on page 48 of Fertilizer Focus, October, 1987).

The problem solved in the above-mentioned C. F. Braun Patent, i.e. the avoidance of high temperature gas coming into contact with the tubes connecting shell and exchanger, does not exist in reactors with several catalytic beds in a single unit since, as mentioned above, the gas/gas exchanger is located directly inside the reactor itself.

C. F. Braun solves the problem of optimal recovery of heat is solved in a complex way by introducing a boiler connected by a complex tube arrangement to the reactor itself (see FIG. 5 in the C. F. Braun Nitrogen '86 presentation and Fertilizer Focus October, 1987, page 48).

All the above designs, although they solve the thermodynamic problem, are very complex and therefore very expensive.

Ammonia synthesis reactors operate in fact at high pressure, generally not below 80 bar, and more often between 130 and 250 bar, and at a temperature (400°-500° C.). The connecting tubes of the various items of equipment necessary according to the schemes described above (as schematically shown in the above-mentioned references) operate under critical conditions (high gas temperature between the various reaction beds) and must therefore be made of special material and with long runs to minimize mechanical stress produced by thermal expansion. The situation is particularly complex in reactors according to C. F. Braun, in spite of the measures taken according to the C. F. Braun UK application No. 2132501A.

The assignee of the present application, continuing its research in this field, has found a process and reactor with several catalytic beds free from the disadvantages described above, which can be constructed in a single apparatus, permitting the easy exchange of heat between catalytic beds, and in particular before the last catalytic bed, in order to achieve maximum recovery of reaction heat at the highest possible degree of heat, said heat being recovered for example to pre-heat the boiler water for the direct production of steam.

In an advantageous embodiment, the hot gas reacted in the last catalytic bed but one is transferred, through a duct usually placed axially in a vertical reactor, directly to the heat recovery system (pre-heater or boiler), to be then returned directly to the reactor by means of a duct either external or internal to the above-mentioned transfer duct, creating an airspace for the gas returning to the reactor, which gas then feeds directly the last catalytic bed with an axial-radial or radial flow either centripetal or centrifugal. Said gas, after being reacted in the last catalytic bed, is then transferred again to the central or external part of the reactor, leaving then from the bottom of the reactor.

BRIEF DESCRIPTION OF THE DRAWINGS

Other features and advantages of the present invention will become apparent when the following text is read in conjunction with the accompanying drawings in which.

DETAILED DESCRIPTION OF THE PREFERRED EMBODIMENTS

Figure 1:
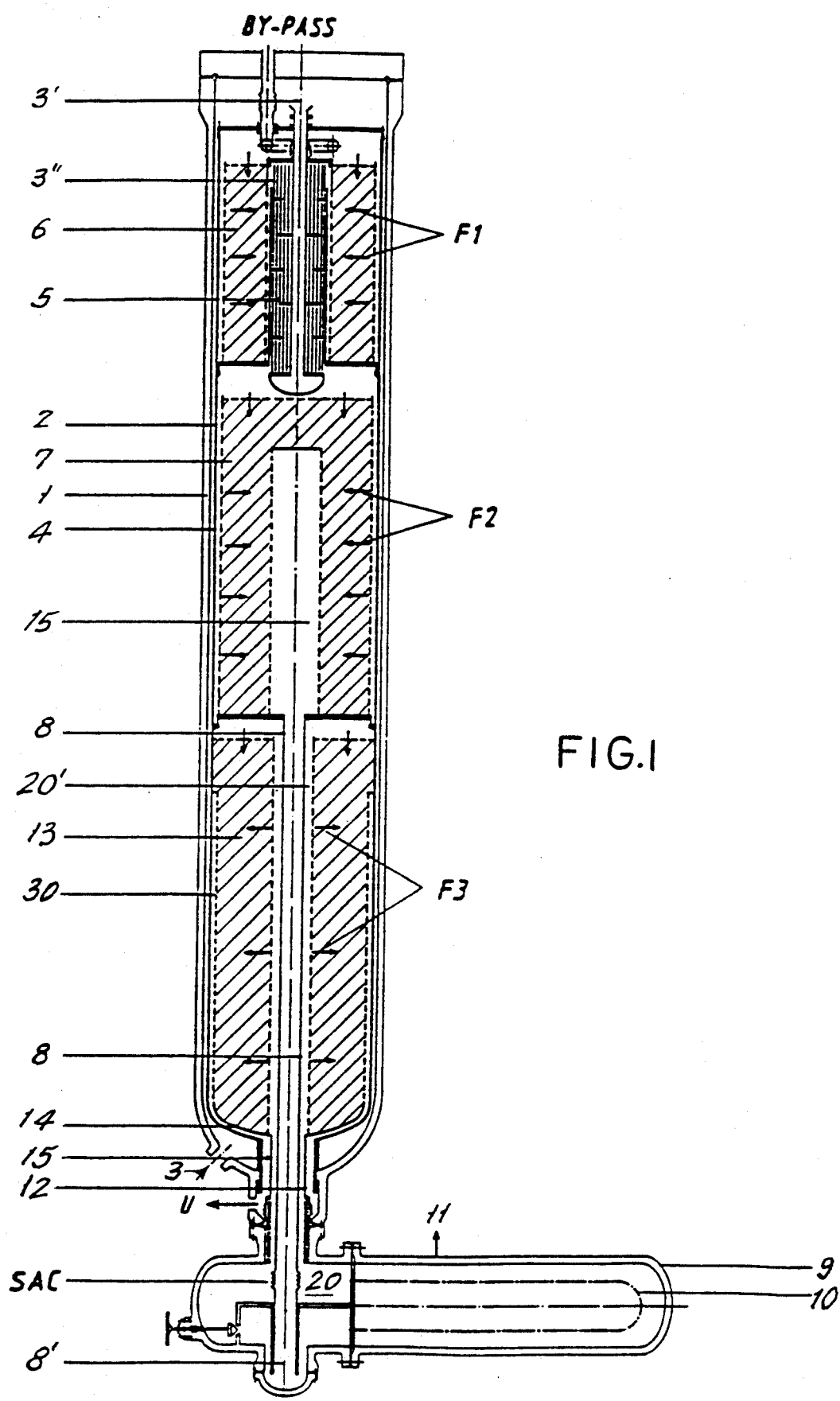
FIG. 1 shows a cross-section of the converter according to a preferred embodiment of the invention.

Referring first to FIG. 1, the reactor, consisting of shell (1) and of cartridge (2) forming the catalytic beds (in this case three, 6, 7, 13), is fed the fresh gas (3) entering from the bottom of the reactor and flowing from the bottom towards the top along the airspace (4) between the internal wall of the shell (1) and the cartridge (2) external wall, for the purpose of reducing to a minimum the temperature of the shell.

The gas (3') leaving said airspace at the upper end of the cartridge containing the three catalytic beds enters the tubes of the gas/gas exchanger (5) situated in the central part of the first catalytic bed (6), where it is pre-heated with the heat from the hot gas (3") coming from the first catalytic bed (6), the bed being run through by the gas with a centripetal flow (Arrows F1).

The hot gas, after having run along the exchanger (5) on the outside of the tubes, feeds the second catalytic bed (7) running through the bed still with an inward flow (Arrows F2).

The operation of a catalytic bed with indirect exchanger (5) is described in greater detail in the Applicant's U.S. Pat. No. 4,405,562.

The hot gas reacted in the second catalytic bed (7) is controlled in 15 and is transferred through a central duct (8) situated axially to the reactor into 8', directly to the heat transfer system (SAC) which is preferably a tube nest (9) with U-shaped tubes (10) where part of the reaction heat is removed by generating system (11). The gas (20'), after the heat has been removed, returns directly to the reactor through a duct (12) outside the transfer duct (8), said gas (20') directly feeding the last catalytic bed (13), running through it with an outward flow (Arrows F3).

The hot reacted gas leaving the bed (13) is then collected in the peripheral external area (30) of said bed and is again transferred to the central part of the reactor running through the airspace (14) of the double bottom of the last catalytic bed, leaving then from the bottom of the reactor through duct (15) (Arrows U).

Figure 2:
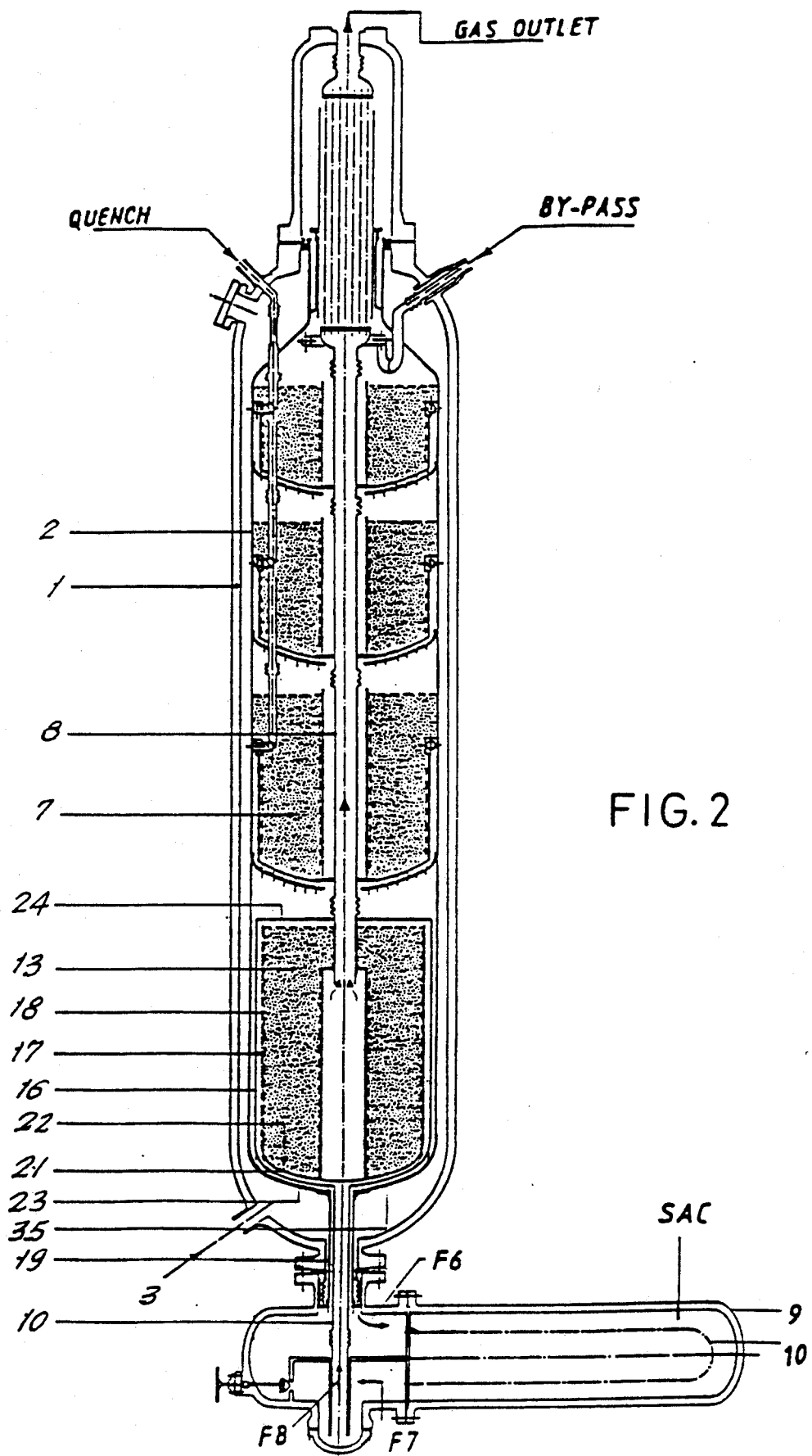
FIG. 2 shows a cross-section of a second preferred embodiment of the invention.

In the embodiment shown in FIG. 2, the gas runs through the catalytic beds with an axial-radial flow, as described in previous Patents granted to the Applicant, such as for example in Swiss Patent No. 643752.

The system for the recovery of heat according to this invention can also be adopted in reactors with catalytic beds in which the gas flow is entirely radial.

The system according to this invention can also be used in reactors operating at a lower pressure where there is no airspace (4) as shown in FIG. 1, and the catalytic beds are directly in contact with the internal wall of the reactor shell (1). In this case the hot reacted gas leaving the bed (13) is then sent again to the central part of the reactor through the airspace (14) formed between the bottom of the last catalytic bed and the shell.

The system according to this invention can also be used to modernize reactors for example according to the Applicant's European Patent Publication No. 0202454.

According to the above embodiment (FIG. 2), the gas coming from the third bed (7) is now sent to heat exchange system SAC (external exchanger) through an airspace (16) formed between the cartridge wall (2) and a new additional cylindrical wall (17) introduced next to the gas distribution wall (18) feeding the last catalytic bed (13) with a centripetal flow.

After running through the airspace (16), the gas runs through the airspace (19) and enters (Arrows F6) the U-shaped tubes (10) of the exchanger (9).

When leaving the exchanger (10) (Arrow F7), the gas enters the reactor again (Arrow 8) through the duct (10) forming the airspace (19) to feed the catalytic bed (13) through the airspace (21) formed by the closed bottom (35) of the catalytic bed (22) and by the bottom (23) connected with the wall (17).

Wall (17) in its upper part also has lid (24) which prevents the mixing of the gas coming from the catalytic bed (7) with the gas feeding catalytic bed (13).

The gas from catalytic bed (13) runs through the transfer duct (8) and leaves the reactor substantially as in FIG. 1.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. In a process for the exothermic, heterogeneous synthesis of a gas, in which the synthesis gas flows through a plurality of catalyst beds which are stacked but separate from each other and which are contained within the same reaction space such that gas exiting one catalyst bed flows through the next catalyst bed, the improvement comprising removing the gas from the reaction space after the gas flows through the second to last catalyst bed, cooling the removed gas, reintroducing the gas into the reaction space, reacting the gas in the last catalyst bed by flowing the gas through the last catalyst bed, and removing the gas from the reaction space, wherein the gas flows in an axial and inwardly radial direction or an inwardly radial direction through the first bed to the second to last bed, and in an outwardly radial direction through the last bed.

* * * * *